United States Patent [19]

Schrader et al.

[11] Patent Number: 5,468,832
[45] Date of Patent: Nov. 21, 1995

[54] HEAT-CURABLE REACTION RESIN MIXTURES AND THE USE THEREOF

[75] Inventors: Lutz Schrader, Krefeld; Hans-Dieter Jakob, Leverkusen; Hanns-Peter Müller, Odenthal; Johann Niggemann, Leverkusen, all of Germany

[73] Assignee: Bayer Aktiengesellschaft, Leverkusen, Germany

[21] Appl. No.: 432,289

[22] Filed: May 1, 1995

[30] Foreign Application Priority Data

May 9, 1994 [DE] Germany .................. 44 16 323.1

[51] Int. Cl.$^6$ .................. C08G 18/18; C08G 18/20
[52] U.S. Cl. .................. 528/53; 528/52; 528/73
[58] Field of Search .................. 528/52, 53, 73

[56] References Cited

U.S. PATENT DOCUMENTS

| | | | |
|---|---|---|---|
| 4,728,676 | 3/1978 | Müller et al. | 521/107 |
| 4,788,224 | 11/1988 | Müller et al. | 521/104 |
| 5,021,536 | 6/1991 | Müller et al. | 528/73 |
| 5,084,544 | 1/1992 | Müller et al. | 528/73 |

*Primary Examiner*—Morton Foelak
*Attorney, Agent, or Firm*—Joseph C. Gil; N. Denise Brown

[57] ABSTRACT

The present invention relates to heat-curable reaction resin mixtures comprising at least one organic polyisocyanate, at least one organic compounds having epoxy rings, and mixtures of certain tertiary amines as reaction accelerators. These reaction resin mixtures are suitable as casting resins for mold making and for the production of various kinds of composites. The curing of the resins takes place in economically reasonable time periods, without excessive evolution of heat, while avoiding shrinkage and the formation of cracks and bubbles.

5 Claims, No Drawings

HEAT-CURABLE REACTION RESIN MIXTURES AND THE USE THEREOF

BACKGROUND OF THE INVENTION

The present invention relates to reaction resin mixtures of organic polyisocyanates, organic polyepoxides and certain accelerators (catalysts) wherein the mixtures are curable by the action of heat to form plastics containing isocyanurate groups and oxazolidino groups. This invention also relates to the use of such resins for the production of composites of all kinds and for the production of coatings and bonding agents of the most varied kind. The reaction resins according to the invention are furthermore suitable for use in mold making.

Reaction resin mixtures of organic polyisocyanates, organic polyepoxides and certain catalysts, prepared by polyaddition of polyepoxides and polyisocyanates with the use of catalysts, are known. In this connection the catalysts used are, in particular, tertiary amines (see for example, DE 3,600,764, DE 3,807,660, DE 3,644,382 and DE 3,904,156). The use of the known reaction resin mixtures, especially in mold making and tool manufacture, however, encounters difficulties in practice. This is due to the speed of curing of the mixtures using the known accelerators and accelerator systems, which are also referred to, for example, in DE 3,807,660 or DE 3,904,156. These known accelerators or accelerator systems cause either too rapid or too slow a curing of the mixtures. Accordingly, it is not easy to avoid shrinkage, cracking and bubble formation in the reactions which proceed rapidly. On the other hand, it is desirable for economic reasons, that the conversion reaction proceedS within a commercially reasonable time.

Therefore, the object of the present invention is to provide heat-curable reaction resin mixtures which cure in economically reasonable periods without excessive evolution of heat and which avoid shrinkage, crack formation, and bubble formation when they are used to produce or manufacture tools and molds.

It has surprisingly been found that using a mixture of specific tertiary amines as reaction accelerators avoids the previous problems while heat-curing in a reasonable time.

DESCRIPTION OF THE INVENTION

The present invention therefore provides reaction resin mixtures comprising
a) at least one organic polyisocyanate,
b) at least one organic compound having epoxy rings, and
c) a mixture of compounds containing amine groups wherein said mixture consists of:
  1) at least one compound selected from the group consisting of:
    i) at least one tertiary amine corresponding to the formula:

$$R^2-\underset{\underset{R^3}{|}}{\overset{\overset{R^1}{|}}{N}}, \quad (I)$$

wherein:
   $R^1$ and $R^2$ represent: a $C_1$–$C_{15}$ alkyl group, and preferably a $C_1$–$C_8$ alkyl group, and
   $R^3$ represents a $C_1$–$C_{15}$ aralkyl group, and preferably a $C_7$–$C_{10}$ aralkyl group;
   ii) N-methylmorpholine,
   ii) diazadicyclooctane, and
   iv) mixtures thereof;

and
2) at least one tertiary amine corresponding to the formula:

$$R^5-\underset{\underset{R^6}{|}}{\overset{\overset{R^4}{|}}{N}}, \quad (II)$$

wherein:
$R^4$ represents: a $C_1$–$C_{15}$ alkyl group, and preferably a $C_1$–$C_8$ alkyl group, and
$R^5$ and $R^6$ represent: a $C_7$–$C_{15}$ aralkyl group, and preferably a $C_7$–$C_{10}$ aralkyl group.

In these reaction resin mixtures, the weight ratio of component c) 1) to component c) 2)is from 1:99 to 20:80; component c)is present in quantities of from 0.5 to 5% by weight, based on the total weight of components a) and b); and the polyisocyanates and the organic compounds having epoxy rings are present in quantities such that there are from 0.05 to 0.30 equivalents of epoxy rings present per equivalent of isocyanate groups present.

In the above formulas for tertiary amines, the preferred alkyl radicals represented by $R^1$, $R^2$, and $R^4$ include methyl, ethyl, propyl, ethylhexyl, and n-octyl, and most preferably methyl and octyl. In The above formulas for tertiary amines, the preferred aralkyl radicals represented by $R^3$, $R^5$, and $R^6$ include benzyl and phenethyl, and most preferably benzyl.

The ratio of the tertiary amine components c)1) to c)2) is preferably from 1:99 to 5:95, and most preferably 3:97.

The reaction resin mixture preferably contains component c), the mixture of tertiary amines in quantities of from 0.5 to 4% by weight, and most preferably of from 2 to 4% by weight, based on the total weight of components a) and b). Furthermore, the organic polyisocyanates a) and the organic compounds b) having epoxy rings are present in the reaction resin in quantities such that there are preferably from 0.10 to 0.30 equivalents of epoxy rings, and most preferably from 0.15 to 0.25 equivalents of epoxy rings, present per equivalent of isocyanate groups.

Of the heat-curable reaction resin mixtures according to the invention, a mixture of tertiary amines consisting of methyldibenzylamine and dimethylbenzylamine, wherein the ratio of methyldibenzylamine to dimethylbenzylamine is from 99:1 to 95:5, has proved to be particularly suitable.

The heat-curable reaction resin mixtures according to the invention have a viscosity of from 20 to 2,000 mPa•s at 25° C.

Suitable compounds for component a) include any organic polyisocyanate of the kind known per se from polyurethane chemistry. Some examples of suitable polyisocyanates include aliphatic, cycloaliphatic, araliphatic, aromatic and heteroaromatic polyisocyanates, such as are described, for instance, by W. Siefken in Justus Liebigs Annalen der Chemie, Vol. 562, pages 75 to 136, for example those of the formula $Q(NCO)_n$, wherein
n represents: 2 to 4, preferably 2, and
Q represents: an aliphatic hydrocarbon radical having 2 to 18, preferably 6 to 10 carbon atoms, a cycloaliphatic hydrocarbon radical having 4 to 15, preferably 5 to 10 carbon atoms, an aromatic hydrocarbon radical having 6 to 15, preferably 6 to 13 carbon atoms, or an araliphatic hydrocarbon radical having 8 to 15, preferably 8 to 13 carbon atoms.

Suitable isocyanates include, for example, ethylene diisocyanate, 1,4-tetramethylene diisocyanate, 1,6-hexamethylene diisocyanate, 1,12-dodecane diisocyanate, cyclobutane 1,3-diisocyanate, cyclohexane 1,3-diisocyanate and cyclohexane 1,4-diisocyanate and any mixtures of these isomers, 1-isocyanato-3,3,5-trimethyl-5-isocyanatomethylcyclohexane (as described in, for example, DE-AS 1,202,785, U.S. Pat. No. 3,401,190), 2,4- and 2,6-hexahydrotolylene diisocyanate and any mixtures of these isomers, hexahydro-1,3- and/or hexahydro-1,4-phenylene diisocyanate, perhydro-2,4'- and/or perhydro-4,4'-diphenylmethane diisocyanate, 1,3- and 1,4-phenylene diisocyanate, 2,4- and 2,6-tolylene diisocyanate and any mixtures of these isomers, diphenylmethane 2,4'-diisocyanate and/or 4,4'-diisocyanate, naphthylene 1,5-diisocyanate.

Additional examples of compounds which are also suitable according to the invention include triphenylmethane 4,4',4"-triisocyanate, polyphenylpolymethylene polyisocyanates, which are obtained by anilineformaldehyde condensation and subsequent phosgenation (as described, for example, in GB 874 430 and GB 848 671), m- and p-isocyanatophenylsulphonyl isocyanates (as described, for example, in U.S. Pat. No. 3,454,606), perchlorinated aryl polyisocyanates (as described, for example, in U.S. Pat. No. 3,277,138), polyisocyanates containing carbodiimide groups (as described, for example, in U.S. Pat. No. 3,152,162), norbornane diisocyanates (as described, for example, in U.S. Pat. No. 3,492,330), polyisocyanates containing allophanate groups (GB 994 890), polyisocyanates containing isocyanurate groups (as described, for example, in U.S. Pat. No. 3,001,973), polyisocyanates containing urethane groups (as described, for example, in U.S. Pat. Nos. 3,394,164 and 3,644,457), polyisocyanates containing acylated urea groups (DE-PS 1,230,778), polyisocyanates containing biuret groups (as described, for example, in U.S. Pat. Nos. 3,124,605, 3,201,372 and 3,124,605), polyisocyanates prepared by telomeriZation reactions (as described, for example, in U.S. Pat. No. 3,654,106), polyisocyanates containing ester groups (as described, for example, in U.S. Pat. No. 3,567,763), conversion products of the abovementioned isocyanates with acetals (DE-PS 1,072,385) and polyisocyanates containing polymeric fatty acids (as described, for example, in U.S. Pat. No. 3,455,883).

It is also possible to use the distillation residues containing isocyanate groups which accrue during the industrial production of isocyanate. Optionally, these may be dissolved in one or more of the above-mentioned polyisocyanates. Moreover any mixtures of the above-mentioned polyisocyanates may be used.

The commercially readily available polyisocyanates are preferred as a rule and include, for example, 2,4- and 2,6-tolylene diisocyanate and any mixtures of these isomers ("TDI"), particularly polyphenylpoly-methylene polyisocyanates, which are prepared by aniline-formaldehyde condensation and subsequent phosgenation (crude "MDI") and polyisocyanates containing carbodiimide groups, urethane groups, allophanate groups, isocyanurate groups, urea groups or biuret groups ("modified polyisocyanates"), particularly those modified polyisocyanates which are derived from 2,4- and/or 2,6-tolylene diisocyanate and from 4,4'- and/or 2,4'-diphenylmethane diisocyanate.

It is particularly preferable to use a mixture of isomers and/or a mixture of homologues of polyisocyanates of the diphenylmethane series having a content of 2,4'-diisocyanatodiphenylmethane of more than 20% by weight.

These are polyisocyanate mixtures of the diphenylmethane series having a content of 2,4'-diisocyanatodiphenylmethane of more than 20% by weight, preferably of from 30 to 70% by weight. Apart from these 2,4'-isomers, the particularly preferred polyisocyanate components generally contain other isomeric and homologous polyisocyanates of the diphenylmethane series. This means that the particularly preferred polyisocyanate components are generally either mixtures of 2,4'-diisocyanatodiphenylmethane with 4,4'-diisocyanatodiphenylmethane and optionally from 0 to 20% by weight, based on the total weight of isocyanate, of 2,2'-diisocyanatodiphenylmethane, or else mixtures of the various isomers with polyphenylpolymethylene polyisocyanates having more aromatic nuclei. The last-named mixtures generally contain from 10 to 60% by weight, based on the weight of the total mixture, of such polyisocyanates having more aromatic nuclei. The diisocyanate mixture enriched by 2,4'-isomers which was mentioned first as a polyisocyanate component preferably used can be obtained, for example, by distilling off a diisocyanate mixture of the given composition from a polyisocyanate mixture, such as is formed by the phosgenation of aniline-formaldehyde condensates. The likewise particularly preferred mixture containing polyisocyanates having more aromatic nuclei can be obtained, for example, by back-mixing the last-named distillation product with a phosgenation product depleted of 4,4'-diisocyanatodiphenylmethane, such as is described in, for example, DE-AS 1,923,214. It is also possible directly to obtain such a mixture, that is, a polyisocyanate mixture whereof the 2,4'-diisocyanatodiphenyl-methane content corresponds to the information given, by appropriate control of the aniline-formaldehyde condensation. By way of example, a path to polyamine mixtures of the diphenylmethane series having a high content of 2,4'-diaminodiphenylmethane is described in, for example, U.S. Pat. No. 3,277,173. The particularly preferably used polyisocyanates can then be obtained directly by phosgenation of these condensates rich in 2,4'-diamino-diphenyl-methane. Paths to such polyisocyanate mixtures are also disclosed in, for example, DE-OS 1,937,685 and in U.S. Pat. No. 3,362,979. In the particularly preferably used polyisocyanate mixtures containing polyisocyanates of the diphenylmethane series having more aromatic nuclei, the content of 2,4'-diisocyanatodiphenylmethane is above 20% by weight, based on the total weight of the mixture.

In addition, monoisocyanates, such as, for example, stearyl isocyanate, may also be concomitantly used, preferably, in quantities of up to 10% by weight, based on the total weight of the mixture of a) and b).

Suitable compounds for component b), the organic compounds containing epoxy rings, include any aliphatic, cycloaliphatic, aromatic or heterocyclic compounds having at least two epoxy rings. Preferably these epoxy rings are 1,2-epoxy rings. The preferred polyepoxides have from 2 to 4, most preferably 2 epoxy rings per molecule, and an epoxide equivalent weight of from 90 to 500, preferably of from 170 to 220. Suitable polyepoxides include, for example, polyglycidyl ethers of multivalent phenols such as, for example, polyglycidyl ethers of catechol, resorcinol, hydroquinone, 4,4'-dihydrodiphenylmethane, 4,4'-dihydroxy-3,3'-dimethyldiphenylmethane, 4,4'-dihydroxydiphenylmethane, 4,4'-dihydroxydiphenylcyclohexane, 4,4'-dihydroxy-3,3'-dimethyldiphenylpropane, 4,4'-dihydroxydiphenyl, 4,4'-dihydroxydiphenylsulphone, tris(4-hydroxyphenyl)-methane, and the chlorination products and bromination products of the above-mentioned diphenols, of novolaks (that is, from reaction products of univalent or multivalent phenols with aldehydes, particularly, formaldehyde in the presence of acid catalysts), from diphenols which have been obtained by esterification of 2 moles of the sodium salt of an aromatic oxycarboxylic acid with 1 mole of an alkyl dihalide or dihalodialkyl ether (cf. British Patent 1,017,612) or from polyphenols obtained by condensation of phenols and long-chain haloparaffins containing at least two halogen atoms (cf. GB-PS 1,024,288). Additional compounds include polyepoxy compounds based on aromatic amines and epichlorohydrin such as, for example, N-di(2, 3-epoxypropyl)aniline, N,N'-dimethyl-N,N'-diepoxypropyl-4,4'-diamino-diphenylmethane, and N-diepoxypropyl-4-aminophenyl glycidyl ether (as disclosed in, for example, British Patents 772,830 and 816,923, the disclosures of which are herein incorporated by reference).

Also suitable are the glycidyl esters of multivalent aromatic, aliphatic and cycloaliphatic carboxylic acids such as, for example, diglycidyl phthalate, diglycidyl adipate and glycidyl esters of conversion products from 1 mole of an aromatic or cycloaliphatic dicarboxylic anhydride and ½ moles of a diol or 1/n moles of a polyol having n hydroxyl groups or diglycidyl hexahydrophthalate, which can be optionally substituted by methyl groups.

Glycidyl ethers of multivalent alcohols including, for example, glycidyl ethers of 1,4-butenediol, glycerol, trimethylolpropane, pentaery-thritol and polyethylene glycols can likewise be used. Of further interest are triglycidyl isocyanurate, N,N'-diepoxypropyloxamide, polyglycidyl thioethers of multivalent thiols such as, for example, from bismercapto-methylbenzene, diglycidyltrimethylene trisulphone, polyglycidyl ethers based on hydantoins.

Additionally, suitable compounds include, for example, epoxidation products of polyunsaturated compounds, such as, for example, vegetable oils and conversion products thereof, epoxidation products of diolefins and polyolefins such as, for example, epoxidation products of butadiene, vinylcyclohexene, 1,5-cyclooctadiene, 1,5,9-cyclododecatriene, polymers and mixed polymers still having epoxidizable double bonds such as, for example, polymers based on polybutadiene, polyisoprene, butadienestyrene mixed polymers, divinylbenzene, dicyclopentadiene, unsaturated polyesters, moreover epoxidation products of olefins, which are obtainable by Dieis-Alder addition and are subsequently converted into polyepoxides by epoxidation with peroxide compounds (peracetic acid) or of compounds which contain two cyclopentene or cyclohexene rings bonded together via bridging atoms or groups of bridging atoms. Furthermore polymers of unsaturated monoepoxides may be mentioned such as, for example, those from glycidyl methacrylate or allyl glycidyl ether.

According to the invention the following polyepoxy compounds or mixtures thereof are preferably used as component b).

Polyglycidyl ethers of multivalent phenols, in particular of bisphenol A; polyepoxy compounds based on aromatic amines, particularly bis(Nepoxypropyl)aniline, N,N'-dimethyl-N,N'-diepoxypropyl-4,4'-diamino-diphenylmethane and N-diepoxypropyl-4-aminophenyl glycidyl ether; polyglycidyl esters of cycloaliphatic dicarboxylic acids, particularly diglycidyl hexahydrophthalate, and polyepoxides of the conversion product from n moles of hexahydrophthalic anhydride and 1 mole of a polyol having n hydroxyl groups (wherein n is equal to an integer from 2 to 6), and in particular 3 moles of hexahydrophthalic anhydride and 1 mole of 1,1,1-trimethylolpropane, 3,4-epoxycyclohexylmethane-3,4-epoxycyclohexane carboxylate.

Liquid polyepoxides, or diepoxides of low viscosity, such as, for example, bis(N-epoxypropyl)aniline or vinylcyclohexane diepoxide, can in special cases further reduce the viscosity of already liquid polyepoxides or convert polyepoxides into liquid mixtures.

Examples of suitable monoepoxides include phenoxypropylene oxide, styrene oxide or glycidol.

To the heat-curable reaction resin mixtures according to the invention can also be added auxiliary substances and additives, and fillers. It is also possible to include in the reaction mixture some compounds which are capable of inhibiting the reaction of the organic polyisocyanates a) with the organic compounds b) containing epoxy rings.

Examples of suitable auxiliary substances and additives are disclosed in, for example, DE 3,904,156. In this connection, olefinically unsaturated monomers which have no hydrogen atoms reactive towards NCO groups are particularly preferred. Examples of such compounds include diisobutylene, styrene, $C_1$–$C_4$ alkylstyrenes such as α-methylstyrene, vinyl chloride, vinyl acetate, $C_1$–$C_8$ alkyl acrylates such as methyl acrylate, butyl acrylate or octyl acrylate, the corresponding methacrylates, acrylonitrile and/or diallyl phthalate as well as graft polymers based on butadiene-styrene-acrylonitrile. Preferably styrene and/or $C_1$–$C_4$ (meth)acrylates and graft polymers based on butadiene-styrene-acrylonitrile are used.

The above-mentioned auxiliary substances and additives are used preferably in quantities of from 1 to 30% by weight, based on the total weight of components a) and b).

Some suitable inorganic or organic fillers which can be added to the reaction resin mixture according to the invention include, for example, quartz powder, chalk or aluminium oxide, pigments such as titanium dioxide, iron oxide, or organic pigments such as phthalocyanine pigments, softeners such as dioctyl phthalate, tributyl phosphate or diphenyl phosphate, agents which can be incorporated to render the mixture compatible, such as methacrylic acid, β-hydroxypropyl ester, maleates and fumarates, soluble dyes or reinforcing agents, such as glass fibres or glass cloth. Carbon fibers and carbon fibrous tissue and other organic polymer fibres, such as aramid fibres or LC polymer fibres (LC="Liquid Crystal") are also suitable. Metallic fillers such as aluminium, copper, iron and/or steel are moreover suitable as fillers. The metallic fillers are preferably used in granular form and/or powder form. The quantity of the said fillers is preferably from 50 to 80% by weight, based on the total weight of the filled reaction resin mixture.

Compounds which are capable of inhibiting the reaction between component a) and component b) can additionally be added to the heat-curable reaction resin mixture. Such inhibiting compounds are always added to the heat-curable reaction resin mixture when the use of the reaction resin mixture in a form which is stable in storage is desired. Suitable as compounds for inhibiting the reaction of a) with b) include, for example, preferably alkylating agents, such as those described in, for example, DE 3,904,156, the disclosure of which is herein incorporated by reference. Such alkylating agents include, in particular, esters of organic sulphonic acids, methyl iodide and/or dimethyl sulphate. Benzenesul-phonic anhydride, benzenesulphonyl chloride, benzenesulphonic acid, dimethyl sulphate, trimethylsilyl trifluoromethane-sulphonate and the reaction product of the reaction of benzenesulphonic acid with epoxides, preferably phenoxypropylene oxide, are also suitable as inhibitors. The compounds inhibiting the reaction of component a) with component b) are used preferably in quantities of from 500 ppm to 10,000 ppm, based on the total weight of components a) and b).

It is of course possible to use the above-mentioned fillers, auxiliary substances and additives as well as the inhibiting compounds in any desired mixture with one another. The most suitable quantity of the above-mentioned additives as well as their mixing ratio can be easily established by suitable preliminary tests. The quantity and the mixing ratio depend in each case on the intended use of the reaction resin mixtures according to the invention.

As already mentioned, the reaction resin mixtures according to the invention are suitable for the production of composites of all kinds. Furthermore, they are also suitable for use as electrical insulating materials, as coatings, as bonding agents and particularly in mold making.

In this respect, reference is made to the previously cited references hereinabove.

When the reaction resin mixtures according to the invention are used, the operation can be carried out by mixing together all or part of the starting materials a), and b), optionally the auxiliary substances and additives, the fillers and the compounds which inhibit the reaction of component a) with component b), then by adding the accelerator system (component c)) and using the processable mixture in the conventional way as impregnating resin or as casting resin. Curing of the mixtures takes place as a rule after addition of the accelerator system at temperatures of from room temperature up to 80° C. The post-curing of the gelated, dimensionally stable resin bodies takes place as a rule at temperatures of from 100° to 250° C., preferably 200° C.

The advantages of the reaction resin mixtures according to the invention include, in particular, the only slight evolution of heat during the curing process, whereby shrinkage, cracking and bubble formation are avoided. Furthermore, the curing reaction in the reaction resin mixtures according to the invention proceeds within commercially reasonable time periods, and can be controlled in a favorable manner by the quantity of accelerator system and by the composition of the accelerator system. The control of the curing reaction and of the heat of reaction by the accelerator system c) according to the invention is to be regarded as particularly surprising, as even small quantities of "rapid catalysts", such as, for example, dimethylbenzylamine, have a disproportionate influence on the accelerating behavior of a "slow" catalyst, such as, for example, dibenzylmethylamine. In this respect, refer to the Table set forth in the Examples hereinbelow.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celcius and all parts and percentages quoted are parts by weight and weight percentages.

EXAMPLES

Example 1

150 g of the respective resin mixture (see Table) was placed in a 200 ml polythene beaker and in each case the given quantity of catalyst (accelerator system) was added with careful stirring.

The gel time of the various reaction mixtures is set forth under each of the various columns which identify the quantity and ratio of the specific accelerator system added to the reaction resin mixture comprising a) and b). This gel time is determined by means of an instrument (Geltimer from the firm Tecam) for measuring gel times. The values shown in the Table are average values of three determinations. All gel times are in minutes unless otherwise indicated.

The resin mixture comprised the following components:

| 80% MDI | (Component A) |
| 20% Bisphenol-A-diglycidylether | (Component B) |

TABLE 1

| | | Gel times [min.] Average values | | | | |
| --- | --- | --- | --- | --- | --- | --- |
| Mixing ratio of A:B | temperature | +1% by weight DB | +2% by MDBA/DB (97:3) | +2% by weight MDBA | +1.94% by weight MDBA | +0.06% by weight DB |
| 100:0 | approx. 23° C. | >24 h | >24 h | >24 h | — | — |
| 95:5 | approx 23° C. | 9.3 | 294.8 | 1555.2 | — | — |
| 90:10 | approx. 23° C. | 8.1 | 161.3 | 1240.6 | — | — |
| 80:20 | approx. 23° C. | 7.5 | 57.4 | 712.4 | 775.8 | 121.8 |

DB = Dimethylbenzylamine
MDBA = Dibenzylmethylamine

Example 2

13,800 g of Al powder and 630 g of Baylith powder are added, with stirring, to 9,200 g of a stabilized resin mixture of 80% of diphenylmethane diisocyanate (60% 2.4' MDI, 40% 4.4' MDI) and 20% of bisphenol A/diglycidyl ether which has been trimerized to a NCO-content of about to 24% and subsequently stabilized, (Blendur® VP KU 3-45t6/4520 1) and the mixture is processed in a vacuum for 1 h. Then 182 g of a mixture of catalysts consisting of methyldibenzylamine and dimethylbenzylamine (97:3) is added with stirring; the mixture is processed in a vacuum for a further 15 minutes and carefully poured into an aluminium mold (50 cm× 20 cm× 10 cm) which is fitted with a thermocouple located in the center thereof. At 54 minutes after addition of the catalyst, the exothermic peak is 79° C.

The mold is heated at 130° C. for 4 h in the drying cabinet, and the molded bodies are heated at 160° C. for 4 h and at 200° C. for a further 4 h and at 250° C. for another 4 hours and then slowly cooled down after the drying cabinet has been turned off. Tempering results in a rectangular block with sharp corners.

Example 3 (Comparison Example)

13,800 g of AI powder and 630 g of Baylith powder are added with stirring to 9,200 g of a stabilized resin mixture of 80% of diphenyl-methane diisocyanate (60% 2.4' MDI, 40% 4.4'-MDI) and 20% of bisphenol A/diglycidyl ether which has been trimerized to a NCO-content of about 23% to 24% and subsequently stabilized, (Blendur® VP KU 3-4516/4520 1:1) and the mixture is processed in a vacuum for 1 h. Then 92 g of dimethylbenzylamine is added with stirring; the mixture is processed in a vacuum for a further 5 minutes and poured carefully into an aluminium mold (50 cm×20 cm×10 cm) which is fitted with a thermocouple located in the center thereof. At 20 minutes after addition of the catalyst, the exothermic peak is 144° C.

The mold is heated at 130° C. for 4 h in the drying cabinet, and the molded bodies are heated at 160° C. for 4 h and at 200° C. for a further 4 h and at 250° C. for another 4 hours and then slowly cooled down after the drying cabinet has been turned off. After tempering, the upper corners of the block exhibit sink marks and lateral bubbles.

Example 4 (Comparison Example)

13,800 g of AI powder and 630 g of Baylith powder are added with stirring to a mixture consisting of 8,653 g of diphenylmethane diisocyanate (60% 2.4'-MDI, 40% 4.4'-MDI) and 456 g of bisphenol A/diglycidyl ether (NCO: EP=95:5). The mixture is processed for 1 h in a vacuum, after which 91 g of dimethylbenzylamine is added, the mixture is stirred for a further 5 minutes in a vacuum and then carefully poured into an aluminium mold (50 cm×20 cm×10 cm), which is fitted with a thermocouple located in the center thereof. At 36 minutes after addition of the catalyst, the exothermic peak is 124° C.

The mold is heated at 130° C. for 4 h in the drying cabinet, and the molded bodies are heated at 160° C. for 4 h and at 200° C. for a further 4 h and at 250° C. for another 4 hours and then slowly cooled down after the drying cabinet has been turned off.

After tempering, the upper corners of the block exhibit sink marks and lateral bubbles.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Heat-curable reaction resin mixtures comprising a) at least one organic polyisocyanate, b) at least one organic compound having epoxy rings, and c) a mixture of compounds containing amine groups wherein said mixture consists of:

1) at least one compound selected from the group consisting of:

i) at least one tertiary amine corresponding to the formula:

$$R^2-\underset{\underset{R^3}{|}}{N}-R^3, \qquad (I)$$

wherein:

$R^1$ and $R^2$ represent: a $C_1$-$C_{15}$ alkyl group, and
$R^3$ represents a $C_1$-$C_{15}$ aralkyl group;

ii) N-methylmorpholine, iii) diazadicyclooctane, and iv) mixtures thereof; and 2) at least one tertiary amine corresponding to the formula:

$$R^5-\underset{\underset{R^6}{|}}{N}-R^6, \qquad (II)$$

wherein:

$R^4$ represents: a $C_1$-$C_{15}$ alkyl group, and
$R^5$ and $R^6$ represent: a $C_7$-$C_{15}$ aralkyl group, wherein the weight ratio of component c) 1) to component c) 2) is 1:99 to 20:80, component c) is present in quantities of from 0.5 to 5% by weight, based on the total weight of components a) and b), and said polyisocyanate and said organic compound having epoxy rings are present in quantities such that there are from 0.05 to 0.30 equivalents of epoxy rings present per equivalent of isocyanate groups present.

2. The heat-curable reaction resin mixtures of claim 1 additionally comprising:

d) from 1 to 30% by weight, based on the total weight of components a) and b), of auxiliary substances and additives, 3. The heat-curable reaction resin mixtures of claim 1 additionally comprising:

e) from 500 to 10,000 ppm, based on the total weight of components a) and b), of compounds which inhibit the reaction of component a) with component b).

4. The heat-curable reaction resin mixtures of claim 1 additionally comprising:

f) from 50 to 80% by weight, based on the total weight of the reaction resin mixture, of inorganic and/or organic fillers.

5. The heat-curable reaction resin mixtures of claim 1, wherein said $R^1$ and $R^2$ represent: a $C_1$-$C_8$ alkyl group, and said $R^3$ represents: a $C_7$-$C_{10}$ aralkyl group in said tertiary amine corresponding to formula (I); and said $R^4$ represents: a $C_1$-$C_8$ alkyl group, and $R^5$ and $R^6$ represent: a $C_7$-$C_{10}$ aralkyl group in said tertiary amine corresponding to formula (II).

* * * * *